(12) United States Patent
Wang et al.

(10) Patent No.: US 9,594,216 B1
(45) Date of Patent: Mar. 14, 2017

(54) FIBER OPTICAL SWITCHES

(75) Inventors: Xinzhong Wang, Fremont, CA (US); Yao Li, Newark, CA (US)

(73) Assignee: Alliance Fiber Optic Products, Inc., Sunnyvale, CA (US)

(*) Notice: Subject to any disclaimer, the term of this patent is extended or adjusted under 35 U.S.C. 154(b) by 0 days.

(21) Appl. No.: 13/156,306

(22) Filed: Jun. 8, 2011

(51) Int. Cl.
*G02B 6/35* (2006.01)
*G02B 6/36* (2006.01)
*G02B 6/42* (2006.01)

(52) U.S. Cl.
CPC .......... *G02B 6/3636* (2013.01); *G02B 6/355* (2013.01); *G02B 6/3528* (2013.01); *G02B 6/3582* (2013.01); *G02B 6/3616* (2013.01); *G02B 6/4231* (2013.01); *G02B 6/4239* (2013.01)

(58) Field of Classification Search
CPC .... G02B 6/355; G02B 6/3528; G02B 6/3636; G02B 6/4231; G02B 6/3582; G02B 6/3616; G02B 6/4239
USPC ........................................................ 385/22
See application file for complete search history.

(56) References Cited

U.S. PATENT DOCUMENTS

| | | | | | |
|---|---|---|---|---|---|
| 4,852,962 | A | * | 8/1989 | Nicia | 385/22 |
| 4,859,022 | A | * | 8/1989 | Opdahl et al. | 385/21 |
| 4,893,891 | A | * | 1/1990 | Fujita | G02B 6/3572 335/128 |
| 5,028,111 | A | * | 7/1991 | Yumoto et al. | 385/51 |
| 5,048,912 | A | * | 9/1991 | Kunikane et al. | 385/23 |
| 5,305,136 | A | * | 4/1994 | Smith | G02F 1/31 359/247 |
| 5,388,172 | A | * | 2/1995 | Anderson | 385/23 |
| 5,436,986 | A | * | 7/1995 | Tsai | 385/16 |
| 5,841,917 | A | * | 11/1998 | Jungerman et al. | 385/17 |
| 5,867,617 | A | * | 2/1999 | Pan | G02B 6/352 385/16 |
| 5,999,669 | A | * | 12/1999 | Pan et al. | 385/18 |
| 6,088,166 | A | * | 7/2000 | Lee | G02B 3/0087 359/652 |
| 6,134,358 | A | * | 10/2000 | Wu et al. | 385/16 |
| 6,198,857 | B1 | * | 3/2001 | Grasis et al. | 385/24 |
| 6,430,322 | B1 | * | 8/2002 | Al-hemyari | G02B 6/122 385/10 |
| 6,437,929 | B1 | * | 8/2002 | Liu | 359/819 |
| 6,445,841 | B1 | * | 9/2002 | Gloeckner et al. | 385/17 |
| 6,473,544 | B1 | * | 10/2002 | Daneman | G02B 6/3582 385/16 |
| 6,570,684 | B1 | * | 5/2003 | Stone | G02B 6/2861 385/18 |
| 6,665,462 | B2 | * | 12/2003 | Wu et al. | 385/18 |
| 6,678,438 | B2 | * | 1/2004 | Chen | 385/20 |
| 6,853,505 | B2 | * | 2/2005 | Sato et al. | 359/821 |
| 7,058,255 | B1 | * | 6/2006 | Fang | G02B 6/3524 385/16 |

(Continued)

*Primary Examiner* — Peter Radkowski
(74) *Attorney, Agent, or Firm* — Dinsmore & Shohl LLP

(57) ABSTRACT

Various designs of optical switch are disclosed. In one embodiment, the optical switch uses wedges to hold up a collimator and secure the wedges and collimator to a substrate with a type of adhesive, thus avoiding high temperature in soldering process. There are at least two assemblies bonded to the substrate using the adhesive. Each of the assemblies includes a collimator and two wedges, where the wedges are provided to physically hold up the collimator in position. The assemblies are glued directly to the substrate after an optical alignment is performed.

11 Claims, 11 Drawing Sheets configuration 1

(56) References Cited

U.S. PATENT DOCUMENTS

| | | | |
|---|---|---|---|
| 7,221,818 B2* | 5/2007 | Cai | G02B 6/3524 385/15 |
| 7,672,554 B1* | 3/2010 | Wang et al. | 385/47 |
| 2001/0031111 A1* | 10/2001 | Irwin | 385/16 |
| 2002/0057864 A1* | 5/2002 | Mills | G02B 6/3542 385/18 |
| 2002/0114556 A1* | 8/2002 | Kato et al. | 385/16 |
| 2002/0154865 A1* | 10/2002 | Lasecki et al. | 385/52 |
| 2002/0164113 A1* | 11/2002 | Rensing et al. | 385/18 |
| 2003/0048982 A1* | 3/2003 | Wu et al. | 385/18 |
| 2003/0053745 A1* | 3/2003 | Chen | 385/20 |
| 2003/0095742 A1* | 5/2003 | Zhou | 385/22 |
| 2003/0108278 A1* | 6/2003 | Chang | 385/21 |
| 2003/0123786 A1* | 7/2003 | Yee | 385/16 |
| 2003/0185498 A1* | 10/2003 | Zhou | 385/22 |
| 2004/0005111 A1* | 1/2004 | Ishikawa et al. | 385/16 |
| 2004/0114648 A1* | 6/2004 | Nagano et al. | 372/36 |
| 2004/0146304 A1* | 7/2004 | Kuhara et al. | 398/138 |
| 2004/0184718 A1* | 9/2004 | Kazama et al. | 385/18 |
| 2005/0147354 A1* | 7/2005 | Yoon et al. | 385/49 |
| 2005/0249454 A1* | 11/2005 | Ko | 385/16 |
| 2006/0013553 A1* | 1/2006 | Imai et al. | 385/140 |
| 2006/0198574 A1* | 9/2006 | Cai | G02B 6/3524 385/16 |
| 2007/0081762 A1* | 4/2007 | Sugiyama et al. | 385/18 |
| 2008/0087378 A1* | 4/2008 | Washburn et al. | 156/275.5 |
| 2012/0001166 A1* | 1/2012 | Doany et al. | 257/43 |
| 2014/0253879 A1* | 9/2014 | Schuck et al. | 353/8 |

* cited by examiner

Fig.7 - configuration 1

Fig.8 configuration 1

Fig.9 configuration 2

FIBER OPTICAL SWITCHES

BACKGROUND OF THE INVENTION

Field of the Invention

The invention is generally related to the area of optical communications. In particular, the invention is related to fiber optical switch assembly, and techniques for packaging such an optical switch.

The Background of Related Art

Optical switches are critical building blocks in fiber optical communication networks and other applications. In optical telecommunication, an optical switch is a switch that enables signals in optical fibers to be selectively switched from one end to another. Electromechanical optical switch is one of the commonly used types. It is operated by moving either the ends of input fibers relative to the ends of output fibers, or a mirror/prism to redirect optical signals to a selected output fiber without moving the optical fibers themselves.

Moving a prism is one technique to build a fiber optic switch. As shown in FIG. 1, a prism 102 is employed to switch a light beam, namely an optical signal can enter and leave such a prism with minimum sensitivity from the motion change of the prism. This technique compares favorably against other mirror-based approaches that may double the sensitivity. However a much longer optical pathway 104 in free space is required for the prism directing optical signals than that of moving the fiber ends. The long optical path in the prism motion-based switch makes it sensitive to fiber collimators which have to be fixed precisely and with minimal drift during any environmental changes throughout its service life. Thus, care must be exercised for the collimator fixations in a fiber optic switch and this fixation is critical for high stability and reliability over a large working temperature range and other environment conditions, therefore the packaging of these collimators is of the most important process in manufacturing a fiber optical switch.

In most compact 1×2 and 2×2 fiber optic switch designs, the collimators are packaged by soldering processes to a metal substrate or a metal case. FIG. 2 duplicates FIG. 2 of U.S. Pat. No. 5,867,617. Although the design is simple, the case must be pre-coated with gold, soldering processes is very critical to ensure the reliability of the switching function. One good feature of soldering-based packaging is that if there is any minor position drift of the collimator from the soldering process, resulting in a light loss increase, one can bend the collimator back to readjust its positions because the solder allows certain degree of deformation. One can also meld the solder again if such bend is too hard to do in room temperature. This flexibility to rework can assure a higher manufacturing yield for assembling the switch. This is why in the compact switch (e.g., 1×2 and 2×2) markets, most switches today are being made by soldering processes. In recent years, environmental protection movements have triggered more and more "Green" manufacturing practices, many countries and regions legislated and regulated the use of lead and thus soldering becomes increasingly under pressure.

Although there are lead-free solders available now, higher melting temperature to use them can cause the fixation process more stressful, leading to reliability issues. Also many optical components being soldered may not withstand the high temperature that can weaken the reliability of the components. This prompts the industry to rethink if there are alternative approaches to make optical switches.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

Various designs of optical switch are disclosed. According to one aspect of the invention, the optical switch uses wedges to hold up a collimator, where the wedges and the collimator are secured to a substrate with a type of adhesive (e.g., epoxy), thus avoiding high temperature in soldering process. There are at least two assemblies bonded to the substrate using the adhesive. Each of the assemblies includes a collimator and two wedges, where the wedges are provided to physically hold up the collimator in position. The assemblies are glued directly to the substrate after an optical alignment is performed.

Depending on implementation, a common port may be assembled and bonded entirely or partially onto the substrate. A mechanism is also provided to alter an optical path between the common port and either one of the two assemblies. The mechanism is controlled by an actuating device (e.g., a relay or an actuator).

The present invention may be implemented as a method, an apparatus or a part of a system. According to one embodiment, the present invention is an optical switch that comprises: a substrate; at least a first assembly for a common port, the first assembly being bonded to the substrate; a second assembly for a first port, the second assembly being bonded to the substrate; a third assembly for a second port, the third assembly being bonded to the substrate, wherein each of the first, second and third assemblies includes a collimator and at least two wedges, the two wedges provided to hold up the collimator and glued together using a type of adhesive; and a mechanism provided to alter an optical path between the common port to either one of the first port and the second port.

According to another embodiment, the present invention is an optical switch that comprises: an enclosure with a hole on one side thereof; a substrate; at least a first collimator as a common port, the first collimator being accommodated in the hole and glued there through with epoxy; a first assembly for a first port, the second assembly being bonded to the substrate; a second assembly for a second port, the second assembly being bonded to the substrate, wherein each of the first and second assemblies includes a second collimator and at least two wedges, the two wedges provided to hold up the second collimator and glued together using a type of adhesive; and a mechanism provided to alter an optical path between the first collimator to either one of the first port and the second port.

According to still another embodiment, the present invention is a method for manufacturing an optical switch device, the method comprises providing a substrate; making a common port with a first collimator; making a first assembly for a first port, the first assembly being bonded to the substrate after the first assembly is aligned to a specification; making a second assembly for a second port, the second assembly being bonded to the substrate after the second assembly is aligned to the specification, wherein each of the first and second assemblies includes a second collimator and at least two wedges, the two wedges provided to hold up the second collimator and glued together using a type of adhesive; providing a mechanism to alter an optical path between the common port to either one of the first port and the second port.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

In the following description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1-11. However, those skilled in the art will readily appreciate that the detailed description given herein with respect to these figures is for explanatory purposes as the invention extends beyond these limited embodiments.

Figure 1:
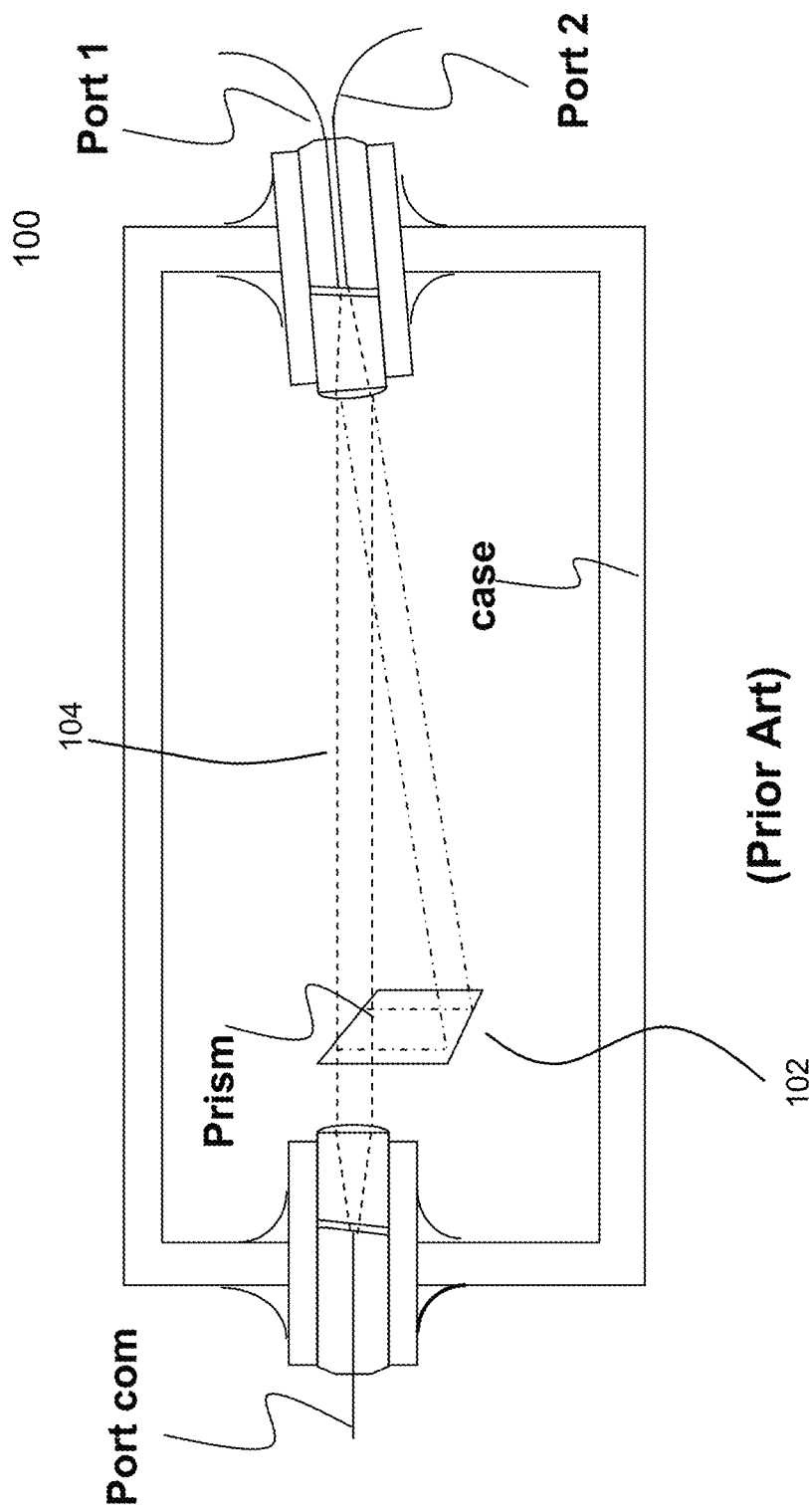
FIG. 1 shows a prior art optical switch using a prism to switch a light beam.
Figure 2:
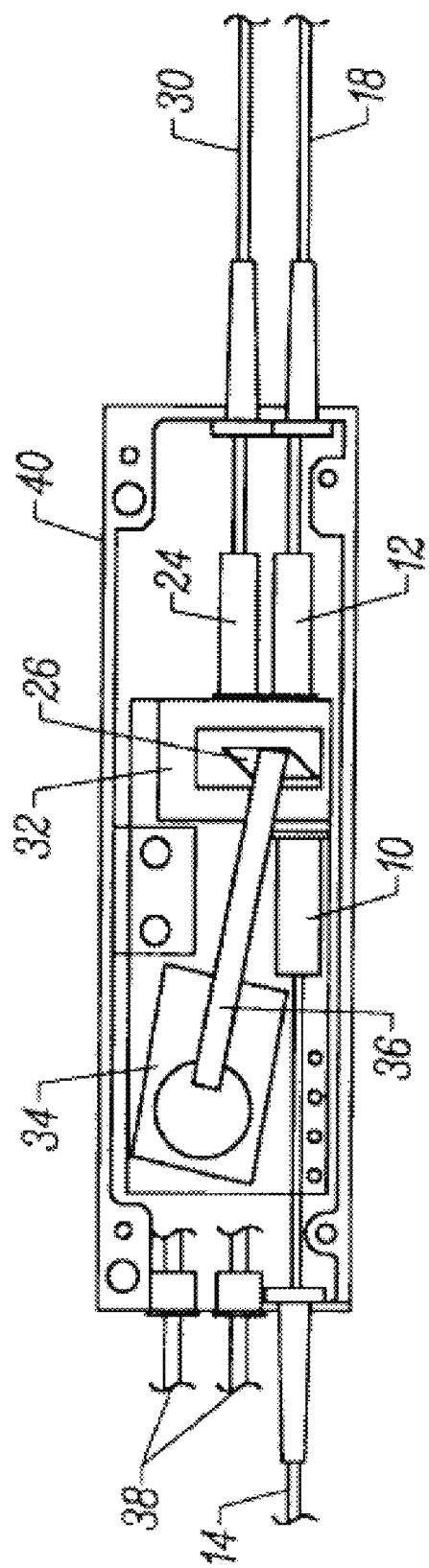
FIG. 2 duplicates FIG. 2 of U.S. Pat. No. 5,867,617.
Figure 3:
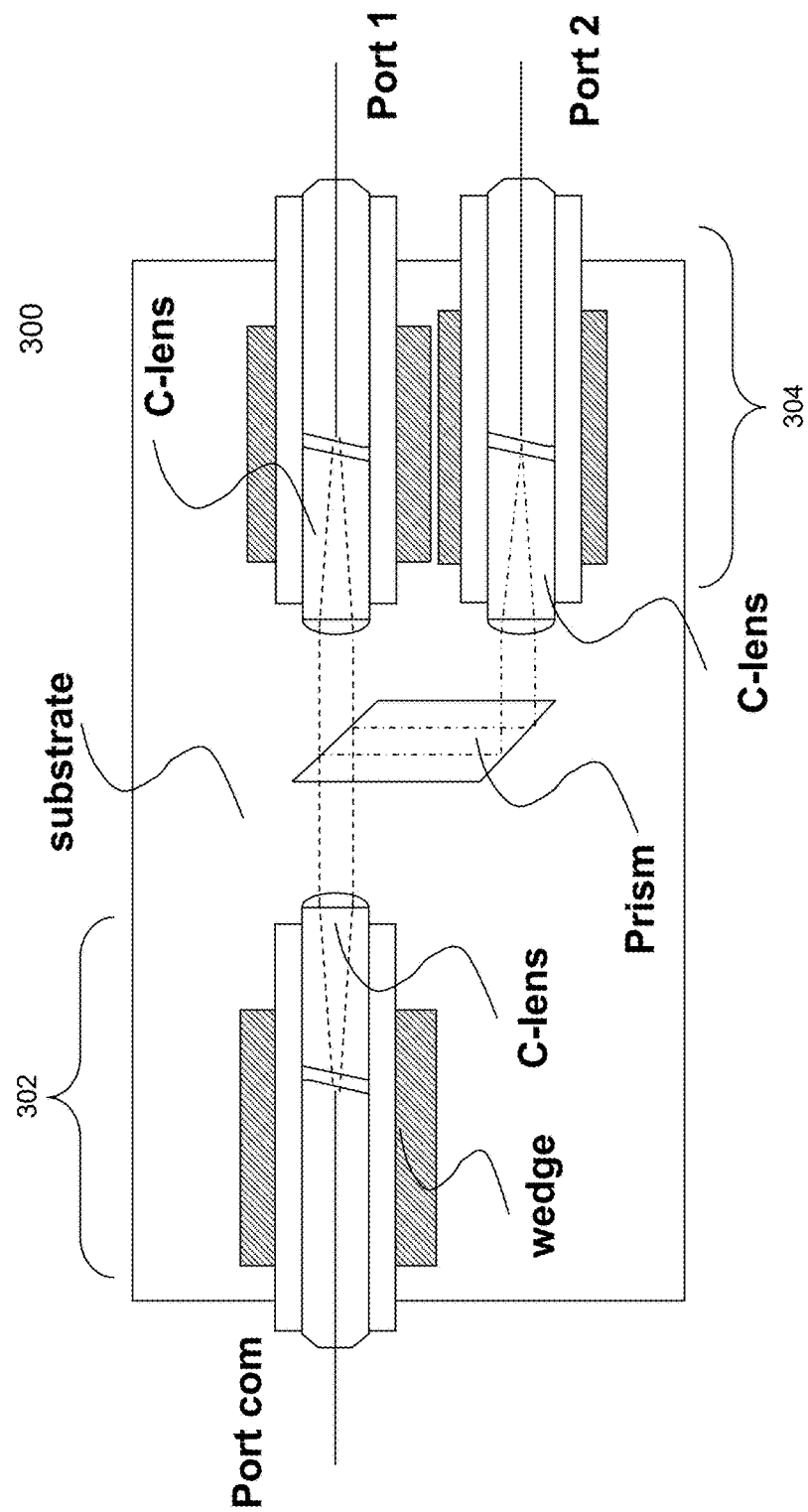
FIG. 3 and FIG. 4 each show an exemplary optical switch according to one embodiment of the present invention.
Figure 4:
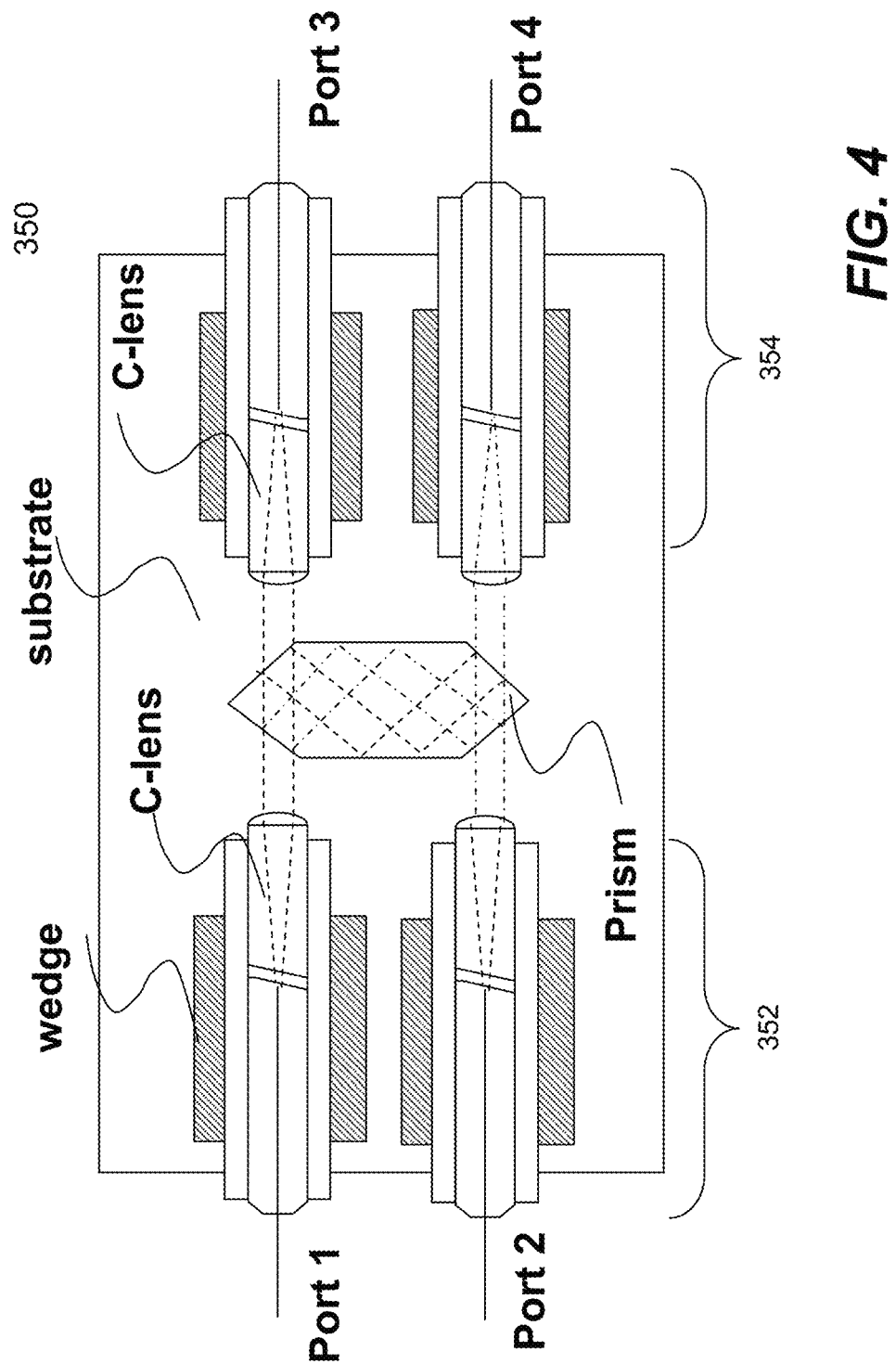

Referring now to the drawings, in which like numerals refer to like parts throughout the several views. FIG. 3 and FIG. 4 each show an exemplary optical switch according to one embodiment of the present invention. The design 300 in FIG. 3A is a 1×2 optical switch while the design 350 in FIG. 3B is a 2×2 optical switch, both are based on an epoxy/wedge process. In other words, the assembly of the design 300 or 350 is made from a process of using epoxy and wedges.

As shown in FIG. 3, the optical switch 300 includes an input assembly 302 and two output assemblies 304 by all epoxy and wedge packaging processes, where each of the collimators has a smallest possibility of curing drift, as well as higher collimator reworkability in case of having some drift. Similarly, as shown in FIG. 4, the optical switch 350 includes two input assemblies 352 and two output assemblies 354 by all epoxy and wedge packaging processes. It should be noted that the input and output assemblies are substantially similar in structure and are so called depending on how light signals are being switched in or out. In any case, one aspect of the present invention is to reduce the manufacture cost of the optical switches and increases their reliabilities. In addition, comparing to the soldering based assembly processes, the designs in FIG. 3 and FIG. 4 are the true lead-free and environment friendly products.

Figure 5:
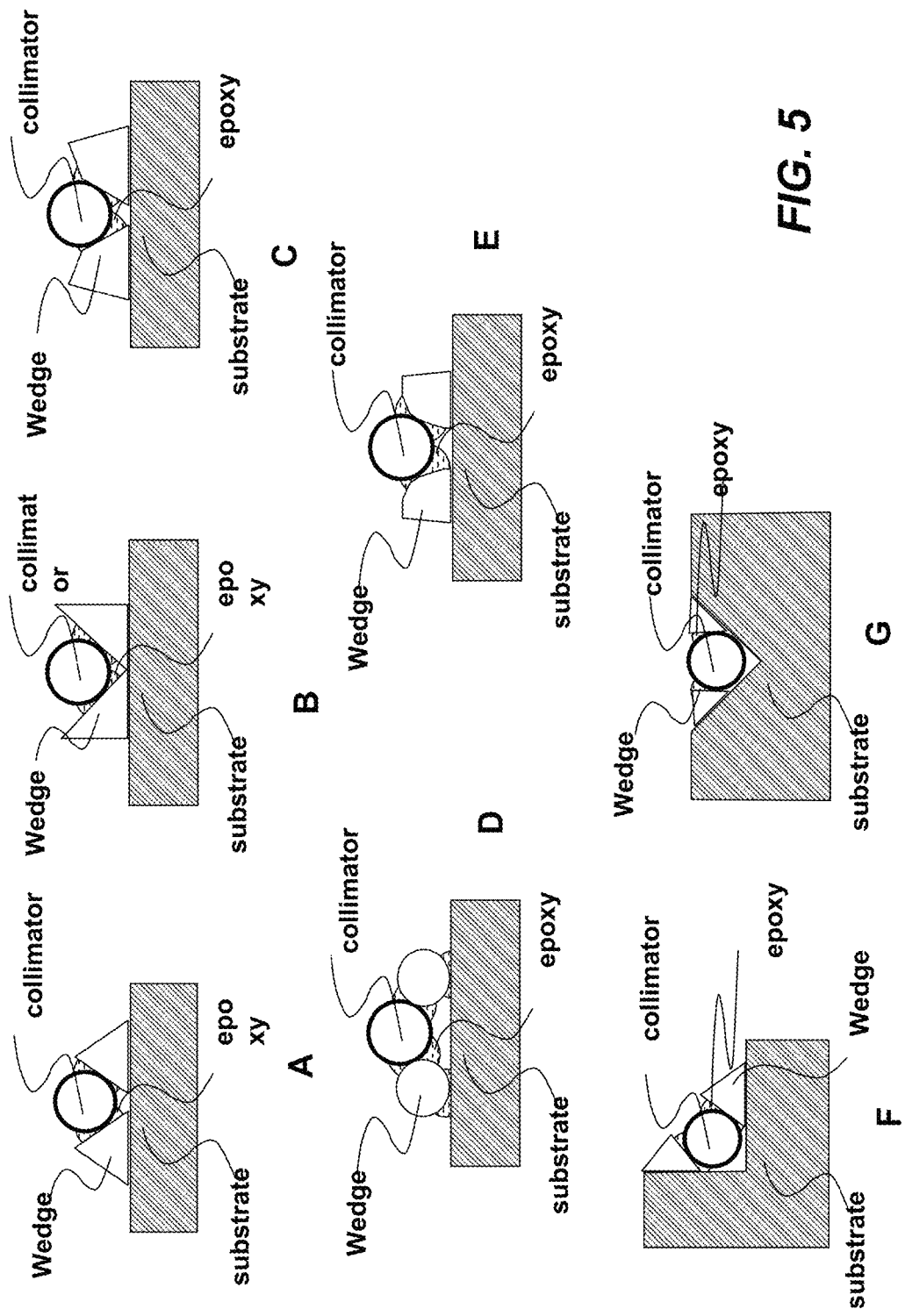
FIG. 5 shows respectively seven exemplary examples to fit various configurations.

One of the aspects of the present invention is the use of wedge and epoxy to bond collimators to a substrate completely or partially if the compactness of the switch design cannot allow all three ports to be completely placed within the enclosure. FIG. 5 shows respectively seven exemplary examples to hold a collimator securely in various configurations. In most situations, a collimator is allowed to float above the substrate, where one or more wedges are used to position the collimator in a fixed manner. The cross-sectional profile of a wedge can be triangle, round or other shapes as long as two or more of such wedges can hold a collimator and bond the collimator with the wedges to a substrate with a type of adhesive.

The fixation of the collimator on a substrate also allows a better reworkability. The wedge can be made in different materials, ranging from quartz, glass, ceramic to metal, etc. In the case of quartz, glass based, UV curing epoxy can be applied due to their UV light transparency features. For ceramic and metal types, one can use the thermally cured epoxy.

Figure 6:
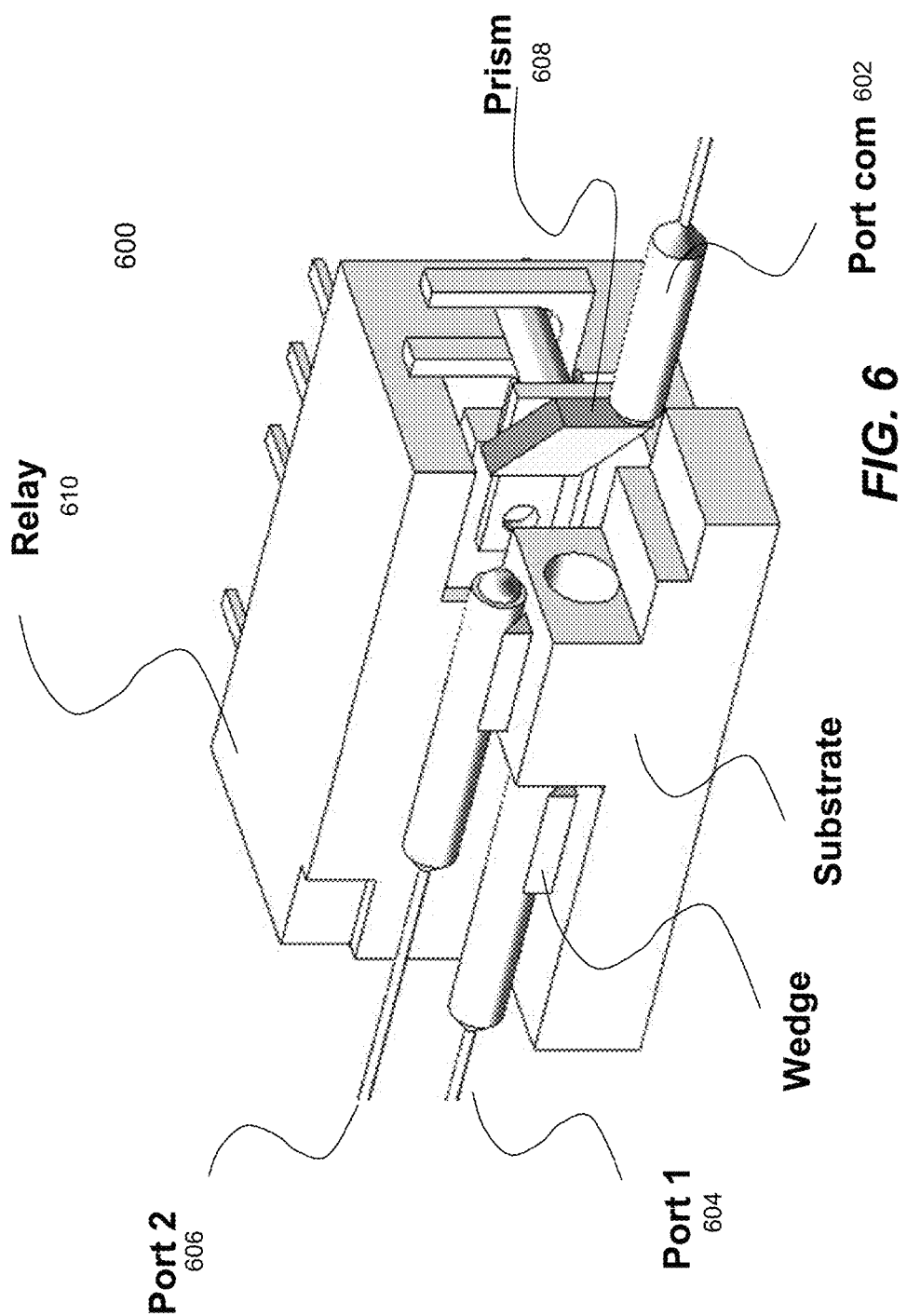
FIG. 6 shows a 3D perspective of an exemplary optical switch with one input and two output ports in a 1×2 switch configuration.

Now referring to FIG. 6, it shows a 3D perspective of an exemplary optical switch 600 with one input 602 and two output ports 604 and 606 in a 1×2 switch configuration. The optical switch 600 is bi-directional, the input port 602 can also be used as an output port. Accordingly, the "input" port 602 is marked as a common port while two "output ports" 604 and 606 are referred to port1 and port2, respectively. Each of the port assemblies 602, 604 and 606 includes an optical collimator, fiber and others. The collimator can be either C-lens or GRIN-lens. All of the individual components are all bonded directly or indirectly to a common substrate through UV or thermal cured epoxy.

A redirect prism 608 is placed between the input and output assembles and is driven by a relay 610, or any other kinds of actuators. When the prism 608 is not in an optical pathway, an optical signal directly goes from the common port 602 to the port1 604, or from the port1 604 to the common port 602. When the prism 608 is in an optical pathway, the optical signal goes from the common port 602 to the port2 606, or from the port2 606 to the common port 602.

Figure 7:
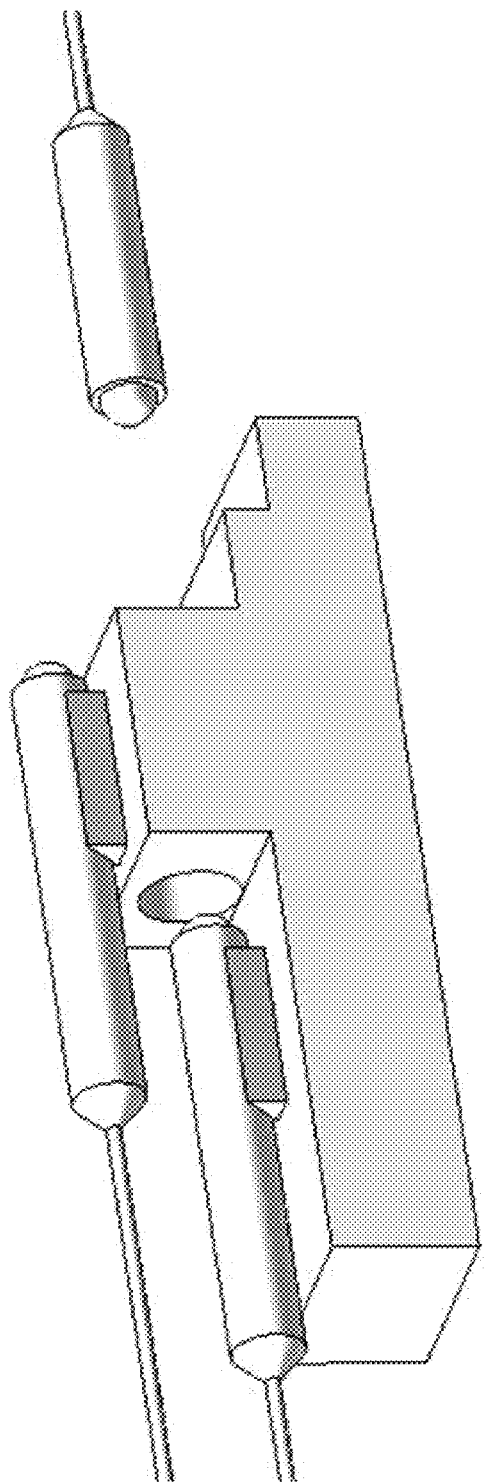
FIGS. 7 and 8 show that collimators are mounted to a common substrate, namely bonded by epoxy through a pair of wedges.
Figure 8:
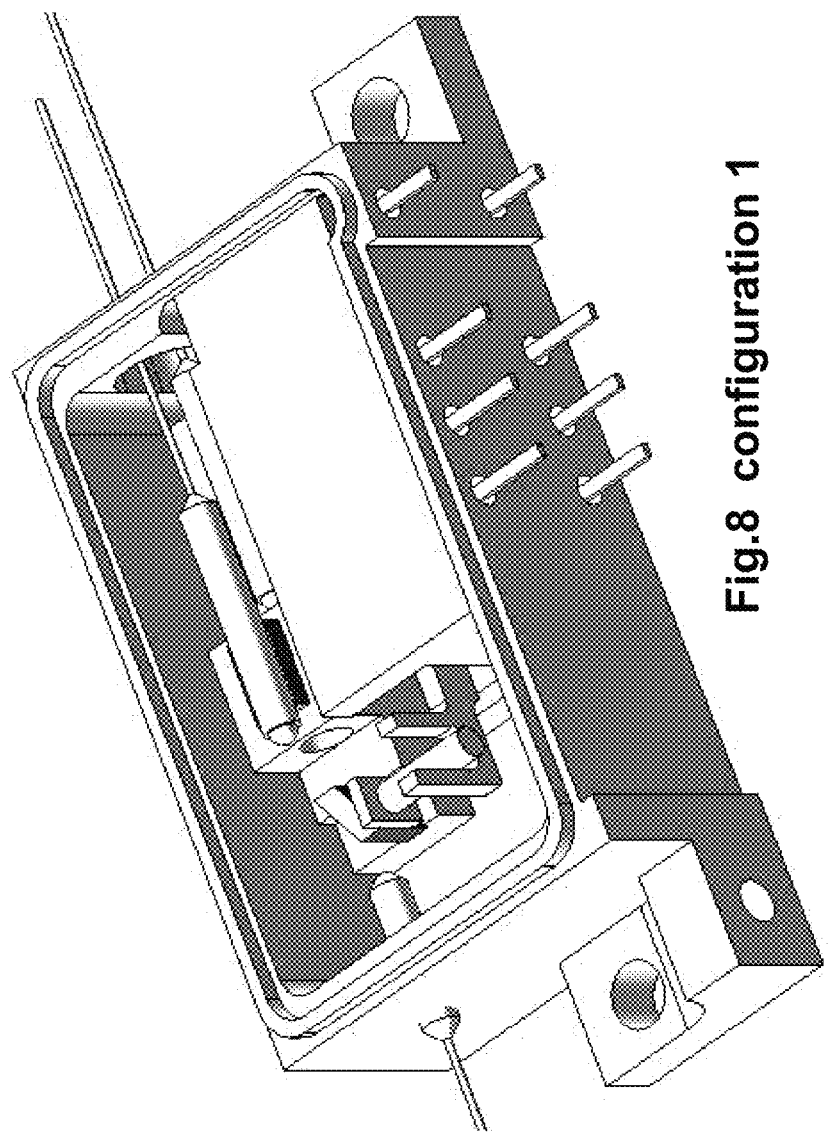
Figure 9:
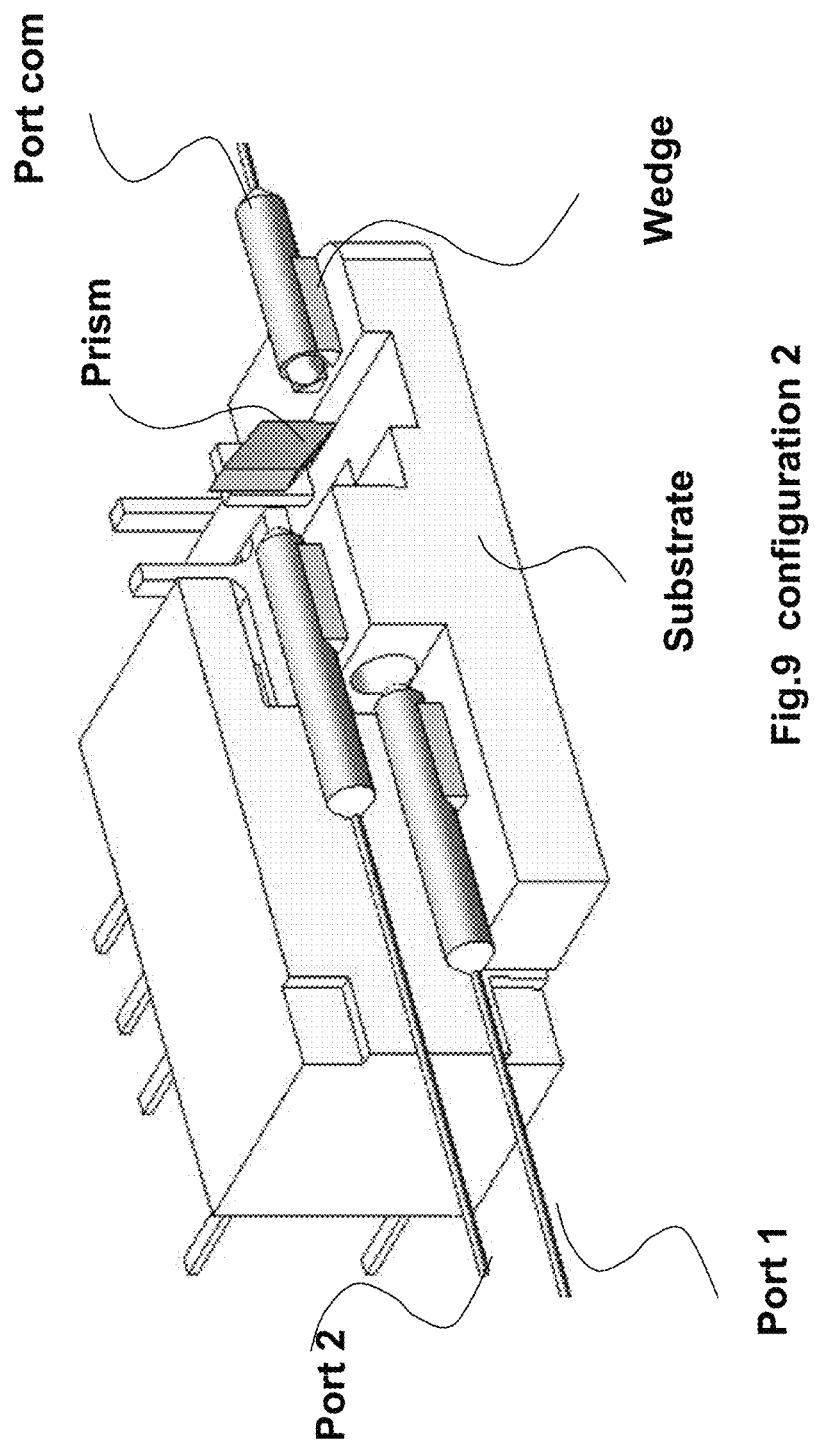
FIGS. 9 and 10 shows together that only collimators in port1 and port2 are mounted on a common substrate while the collimator in the common port is mounted on one side of an enclosure through a hole thereof.
Figure 10:
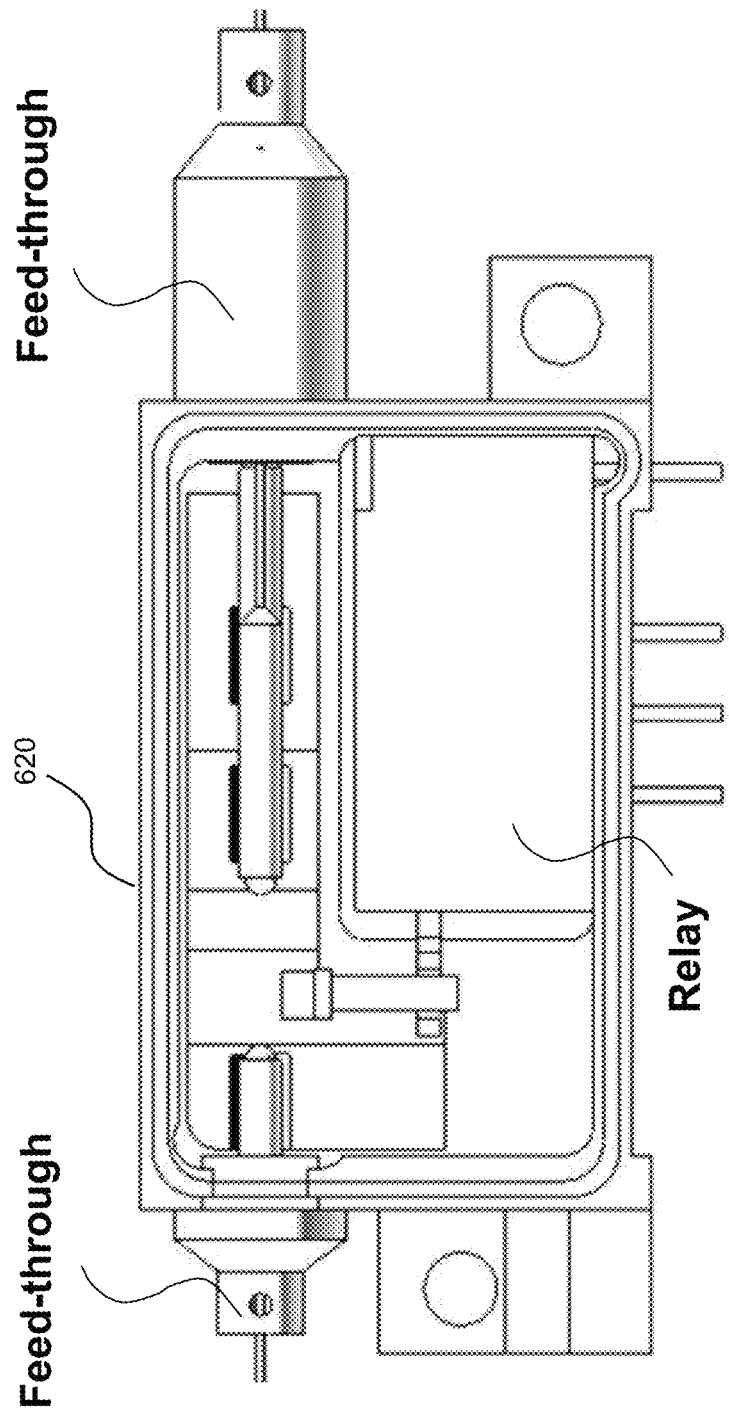

It may be seen in FIGS. 6, 7, and 8 that the collimators are mounted to a common substrate, namely bonded by epoxy through wedges, 2 wedges for each collimator. FIGS. 9 and 10 shows together that only collimators in port1 and port2 are mounted on a common substrate while the collimator in the common port is mounted on the switch case side through the enclosure 620. In other words, there is a hole made on the enclosure 620 to accommodate a collimator that is fixed by thermal curing epoxy. In one embodiment, the collimator contacts the hole closely so there is no wedge needed.

Figure 11:
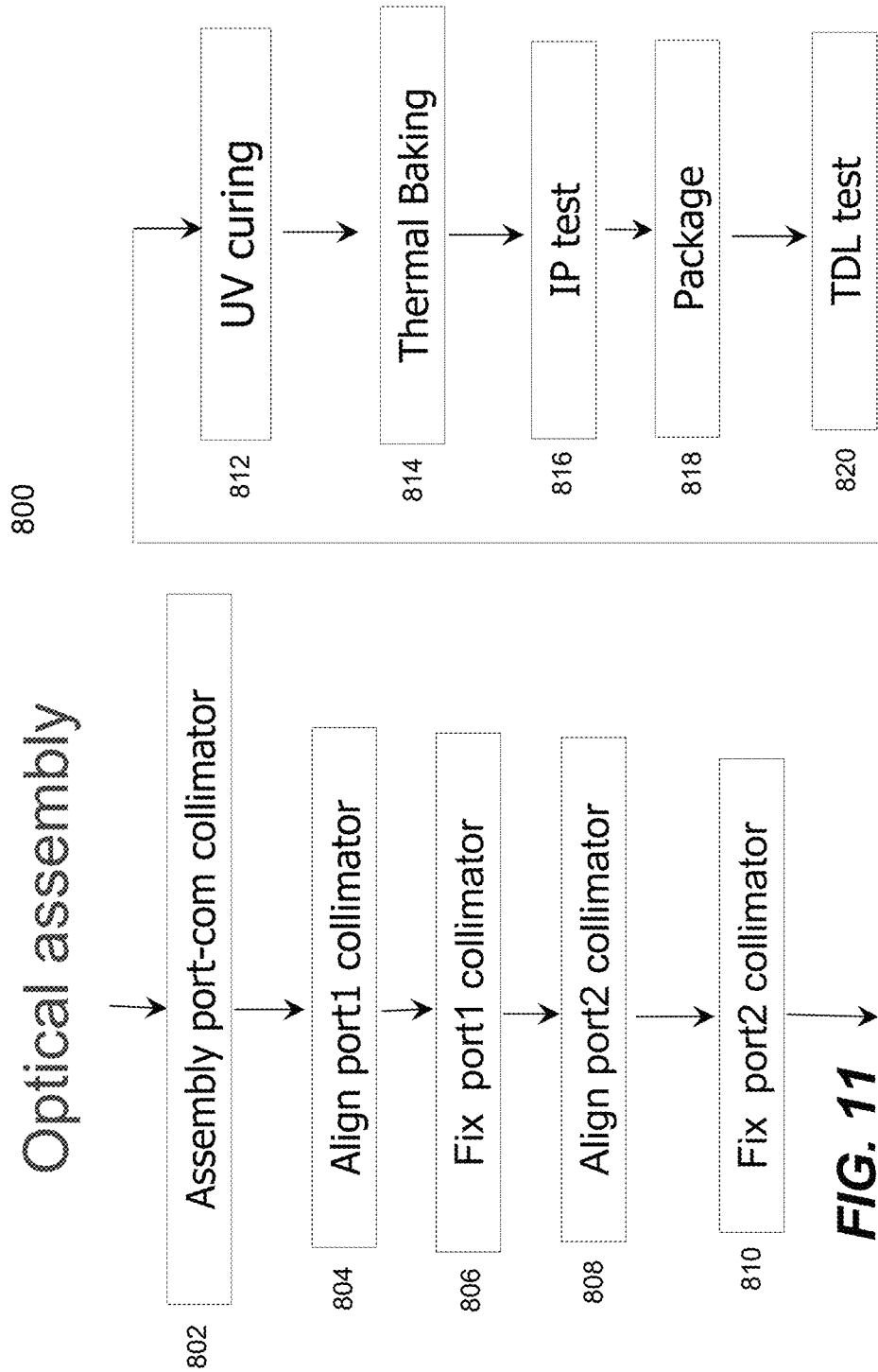
FIG. 11 shows a process of assembling an optical switch according to one embodiment of the present invention.

FIG. 11 shows a process 800 of assembling an optical switch according to one embodiment of the present invention. The process 800 may be understood in conjunction with the foregoing figures and descriptions thereof. At 802, the common port (a.k.a., port-com) is first assembled. Depending on implementation, the assembly for the common port may be inserted through a hole of an enclosure or bonded directly onto a substrate using a type of adhesive.

At 804 and further at 808, it is assumbled that two assemblies for port1 and port2 are already done and ready to be bonded to the substrate. According to one embodiment, an assembly includes a collimator and two wedges bonded together, where the wedges are used to hold the collimators onto the substrate. Before bonding the assembly for port1 to the substrate, an alignment of the assembly must be performed to ensure that a light beam is coming to or going out from the collimator at a right angle, to minimize possible signal loss. Once the alignment of the assembly for port1 is done, the assembly is boned to the substrate by epoxy at 806. The similar procedure is peformated for the assembley for port2 is done at 810.

At 812, a UV curing process is applied to harden the epoxy, and followed by thermal backing at 814. At 816, a prism or an optical switching mechanism is installed and necessary tests are performed to ensure that the oiptical switching function is achieved to a predefined standard or requirement. At 818, an enclosure is provided to house the substrate along with other parts including a relay used to control the prism or the optical switching mechanism. At 620, a final test is performed.

Optical switches designed in accordance with the present invention are generally adapted to provide high reliability and good switching performance at affordable cost, insert loss are usually below 0.5 dB, over typical working temperature from −5° C. to +70° C. with <0.4 Db TDL, >50 dB return loss, 1260 nm to 1650 nm working wavelength range. The designs and packaging processes are not limited to 1×2 designs, can be extended to 1×N or N×M designs based on different collimator/prism arrangements and layouts.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. For example, the variable neutral density filter may be replaced by another device that can strengthen an optical signal. Accordingly, the scope of the present invention is defined by the appended claims rather than the foregoing description of embodiments.

What we claim is:

1. An optical switch device comprising: an enclosure with a first hole on a wall thereof; a substrate; a first assembly for a common port, the first assembly including a first collimator securely positioned through the first hole; a second assembly for a first port, the second assembly being bonded to the substrate and including a second collimator, a third assembly for a second port, the third assembly being bonded to the substrate and including a third collimator, wherein the first collimator is optically aligned with the second collimator through a second hole formed in a raised portion of the substrate, the raised portion is positioned between the first assembly and the second assembly, the third assembly is secured on top of the raised portion, the substrate in secured within the enclosure in such a way that the first, second and third collimators forming a first virtual plane encompassing two respective optical paths between the first collimator and the second collimator we well as the first collimator and the third collimator, and the second hole lies on the first virtual plane, each of the second and third collimators is steadily held up by at least two wedges; and a prism provided to alter an optical path between the common port to either one of the first port and the second port, wherein the prism is on a second virtual plane perpendicular to the first virtual plane, and is caused to move along the second virtual plane, and the third collimator is always closer than the second collimator to the second virtual plane.

2. The optical switch device as recited in claim 1, wherein the prism is bonded to a plate extended by an elongated member driven by an actuating device.

3. The optical switch device as recited in claim 2, wherein the actuating device is housed in the enclosure.

4. The optical switch device as recited in claim 2, wherein a cross-sectional profile of each of the wedges is in a predefined shape so that two of the wedges is sufficient to secure a round collimator in position.

5. The optical switch device as recited in claim 2, wherein the actuating device is also integrated with the substrate as a single integrated part before the actuating device and the substrate are placed in the enclosure.

6. The optical switch device as recited in claim 1, further comprising a relay to drive the prism, wherein the substrate is disposed next to the relay in parallel.

7. An optical switch device comprising: an enclosure with a first hole on a side thereof; a substrate including a raised portion, wherein a second hole is formed in the raised portion; a first collimator as a common port, the first collimator being accommodated in the first hole and glued therethrough with epoxy; a second collimator for a first port, the second collimator being bonded to the substrate and aligned optically with the first collimator via the second hole; a third collimator for a second ort. the third collimator being disposed and bonded on top of the raised portion of the substrate, wherein each of the first and second collimators is secured by at least two wedges, the wedges hold up the each of the first and second collimators and glued together using a type of adhesive, wherein the first collimator, second and third collimators form a first virtual plane to encompass two respective optical paths between the first collimator and the second collimator we well as the first collimator and the third collimator, and the second hole lies on the first virtual plane: a prism provided to alter an optical path between the first collimator to either one of the second and third collimators, the prism is on a second virtual plane perpendicular to the first virtual plane, and is caused to move along the second virtual plane, and the second collimator is always farther than the third collimator to the second virtual plane.

8. The optical switch device as recited in claim 7, wherein the prism is bonded to a plate extended by an elongated member driven by an actuating device.

9. The optical switch device as recited in claim 8, wherein a cross-sectional profile of each of the wedges is in a predefined shape so that two of the wedges secure a round collimator in position.

10. The optical switch device as recited in claim 8, wherein the actuating device is also integrated with the substrate as a single integrated part before the actuating device and the substrate are placed in the enclosure.

11. The optical switch device as recited in claim 7, further comprising a relay to drive the mechanism, wherein the substrate is disposed next to the relay in parallel.

* * * * *

UNITED STATES PATENT AND TRADEMARK OFFICE
CERTIFICATE OF CORRECTION

PATENT NO. : 9,594,216 B1  
APPLICATION NO. : 13/156306  
DATED : March 14, 2017  
INVENTOR(S) : Xinzhong Wang Page 1 of 1

It is certified that error appears in the above-identified patent and that said Letters Patent is hereby corrected as shown below:

In the Claims

Column 6, Claim 1, Line 8:
"secured on top of the raised portion, the substrate in secured"
Should read:
--secured on top of the raised portion, the substrate is secured--;

Column 6, Claim 1, Line 12:
"the second collimator we well as the first collimator and the"
Should read:
--the second collimator as well as the first collimator and the--; and Column 6, Claim 7, Line 56:
"second collimator we well as the first collimator and the"
Should read:
--second collimator as well as the first collimator and the--.

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*